United States Patent Office 3,559,333
Patented Feb. 2, 1971

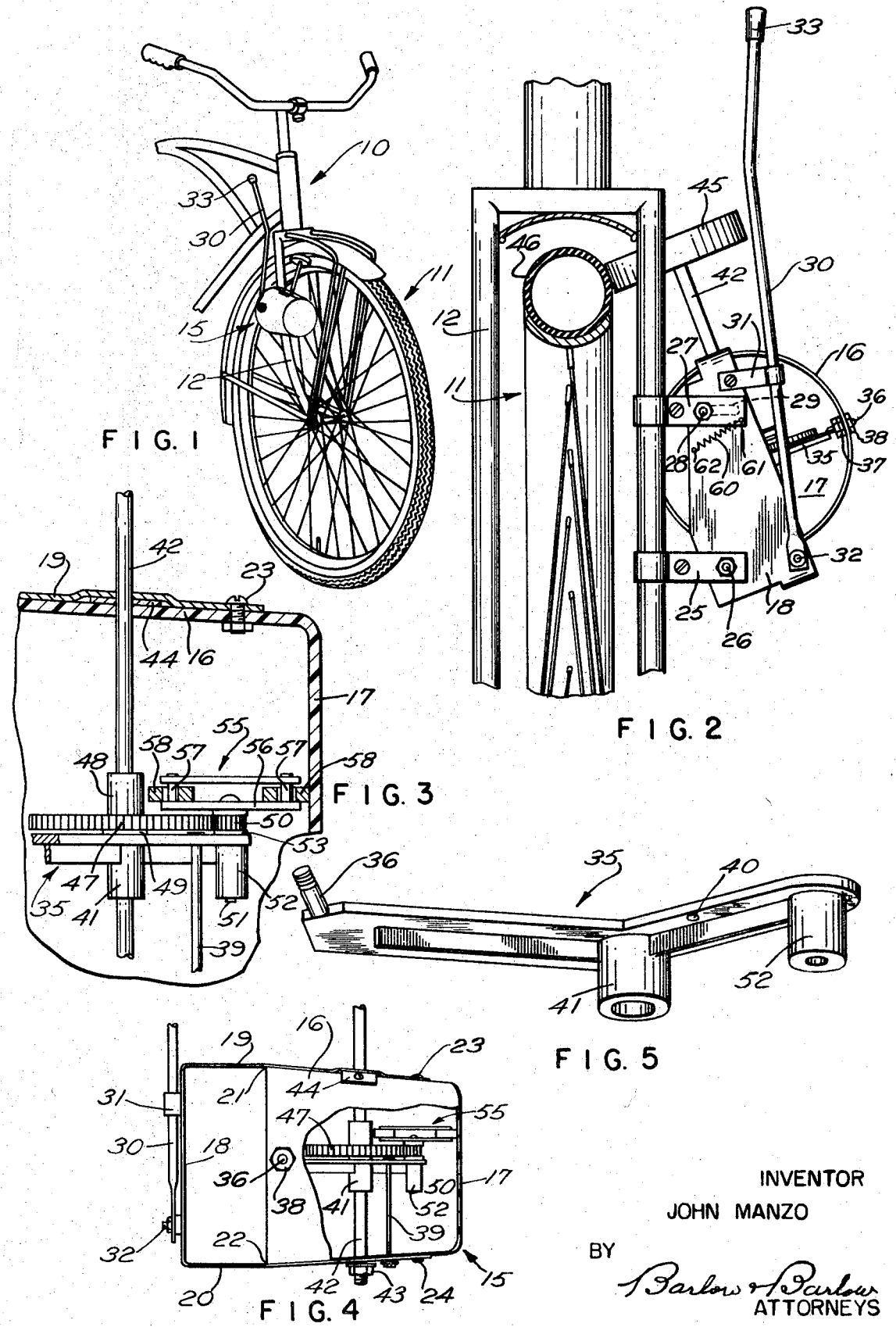

3,559,333
NOISEMAKING DEVICE
John Manzo, 1225 Cranston St., Cranston, R.I. 02920
Filed Sept. 4, 1968, Ser. No. 757,387
Int. Cl. A63h 5/00
U.S. Cl. 46—175
5 Claims

ABSTRACT OF THE DISCLOSURE

A cup device bodily movable into engagement with a bicycle wheel and having means for striking a diaphragm end of the cup to produce a noise simulating a motor sound.

BACKGROUND OF THE INVENTION

Devices have heretofore been made which may be mounted upon a bicycle to be actuated by the wheel thereof which are usually made of some special parts and of a relatively complex nature and consequently are relatively expensive.

SUMMARY OF THE INVENTION

A plastic cup is rockably mounted on the fork of a bicycle wheel with a spindle diametrically mounted across the walls of the cup and carrying a wheel to contact the bicycle tire and be rotated thereby to drive a means mounted on a bracket within the cup for rotating a striking device to hit or strike the diaphragm-like bottom of the cup and make a noise by reason of the vibrations of the diaphragm.

BRIEF DESCRIPTION OF THE DRAWINGS

FIG. 1 is a perspective view of the forward end of a bicycle with the device of this invention in place thereon;

FIG. 2 is a sectional view just rearwardly of the fork of the bicycle frame showing the means for mounting the device on the frame;

FIG. 3 is a sectional view through the cup of the device;

FIG. 4 is an elevation of the device partly in section showing the fork mounting means and the mechanism within the cup; and FIG. 5 is a perspective view of the mounting bracket for the mechanism in the cup.

DESCRIPTION OF THE PREFERRED EMBODIMENT

With reference to the drawings, 10 designates generally the forward end of a bicycle having a wheel with a tire thereon 11 rotatably mounted in the fork 12.

A cup 15 conveniently formed of plastic material of the type which may be used as a food container and readily obtainable on the market has a generally cylindrical wall 16 and a circular bottom 17. A plate 18 extends across the open end of the cup in spaced relation to its end and has a pair of arms 19 and 20 (FIG. 4) which are bent toward each other at the junction 21 and 22 with the cup 15 to extend along the cup which is slightly tapered with fastenings thereto by bolts 23 and 24. A bracket 25 (FIG. 2) is secured to the fork of the bicycle frame and pivotally mounts as at 26 the plate 18 and the cup carried thereby. A second bracket 27 is secured to the frame and carries a bolt 28 which may slide in the slot 29 of the plate 18 to be guided thereby and serve as a means by which the plate and cup may be moved toward and from the wheel. A rod 30 is secured by a bracket 31 to the plate near the upper end of the plate while it is secured as at 32 at the lower end of the plate, and a handle 33 at the upper end of the rod may be utilized for moving the plate and cup toward and from the bicycle wheel 11.

A bracket designated generally 35 (FIG. 5) is mounted by means of a stud 36 extending through the cylindrical wall of the cup having securing nuts 37 and 38 (see FIG. 2) and is supported by a rod 39 (FIG. 4) extending through opening 40 of this bracket. This bracket carries a center bearing 41 through which a spindle 42 extends, which spindle also has a bearing by reason of its extending through a wall of the cup and the arm 20 with a nut 43 engaging a washer on the outer surface of the cup. This spindle also extends diametrically across the cup and through the wall 16 thereof and also through the arm 19 of the plate where its bearing is increased in thickness by a washer 44, thus providing a secure thru bearing mounting for the spindle.

A contact wheel 45 at the upper end of this spindle is adapted to engage the tire 46 of the wheel so as to impart rotation to the spindle through this contact wheel 45. A gear 47 having a hub 48 is fixed to the spindle 42 with a washer 49 resting upon the bracket 35 and supporting the gear 47 and in position against axial movement of the spindle. This gear 47 meshes with a smaller gear 50 which has a shaft 51 extending through the bearing 52 of the bracket 35, while its hub portion 53 rests on the upper surface of the bracket and supports the gear position. The shaft 51 extends through and is fixed to a frame 55 having spaced bars 56 which are held in spaced relation by pins 57 which rotatably mount resilient discs 58 such as rubber or fiber discs which are relatively hard. These discs rotate upon the pins 57 and are so located that when the frame 55 is rotated, they will strike the diaphragm bottom of the cup, causing the diaphragm to vibrate and make a noise. The striking will be intermittent by reason of their being two of these discs mounted in the frame although the particular number of discs is not important as there may be more than two if desired.

In order to place this device in operation, it is merely necessary to swing the device so that the wheel 45 contacts the bicycle tire 46 when motion will be transmitted to the spindle 42 to the gear 47 and thence to gear 50 which will rotate the frame 55, causing the discs 58 to strike against the diaphragm bottom wall of the cup. When it is desired that the noise be stopped, the handle 33 will be released, and a spring 60 attached as at 61 to the bracket 27 and to the plate as at 62 will pull the device about its pivot 26 to remove the wheel 45 from contact with the bicycle tire.

I claim:

1. A motor sound simulating device for a conventional bicycle comprising an integral cup having a generally cylindrical wall with a generally flat circular bottom at right angles to the longitudinal axis of the cylindrical wall, means for mounting said cup on the wheel frame of a bicycle for pivotal movement bodily toward and away from the wheel thereof, a spindle rotatably mounted within said cup diametrically across a side wall and extending outwardly beyond said wall, a contact wheel mounted on the outwardly extending portion of said spindle adjacent one end thereof and adapted to contact the bicycle tire and be rotated thereby when swung into engagement with said tire, striking means rotatably mounted within said cup and so located as to strike said bottom as rotated, and motion transfer means within the cup operated by said spindle for rotating said striking means from said spindle as the spindle is rotated.

2. A device as set forth in claim 1 wherein said striking means comprises a frame with resilient discs mounted therein to strike and slide along said bottom as rotated.

3. A device as set forth in claim 1 wherein said striking means comprises a frame with rotatable discs mounted therein to strike and roll along said bottom as rotated.

4. A device as set forth in claim 1 wherein a bracket is fixed to said wall and said bracket rotatably mounts said striking means.

5. A device as set forth in claim 1 wherein a bracket is fixed to said wall and said bracket rotatably mounts said striking means and provides a bearing intermediate the diametrical portions of said wall for said spindle.

References Cited

UNITED STATES PATENTS

| | | | |
|---|---|---|---|
| 618,107 | 1/1899 | Kraushaar | 116—61 |
| 3,003,280 | 10/1961 | Gordon | 46—191X |
| 3,054,377 | 9/1962 | Scott | 116—61 |
| 3,266,455 | 8/1966 | Cohn | 46—175X |

ANTONIO F. GUIDA, Primary Examiner

R. F. CUTTING, Assistant Examiner

U.S. Cl. X.R.

46—191, 116—61